US008462818B2

(12) United States Patent
Zarubinsky et al.

(10) Patent No.: US 8,462,818 B2
(45) Date of Patent: Jun. 11, 2013

(54) METHOD FOR PROCESSING CDMA SIGNALS AND A DEVICE HAVING CDMA SIGNAL CAPABILITIES

(75) Inventors: Michael Zarubinsky, Rishon-Lezion (IL); Boris Beri, Be'er Sheva (IL); Boaz Perlman, Peduel (IL); Leonid Smolyansky, Or Akiva (IL); Alexander Sverdlov, Hod Hasharon (IL)

(73) Assignee: Freescale Semiconductor, Inc., Austin, TX (US)

( * ) Notice: Subject to any disclaimer, the term of this patent is extended or adjusted under 35 U.S.C. 154(b) by 666 days.

(21) Appl. No.: 12/375,796

(22) PCT Filed: Aug. 2, 2006

(86) PCT No.: PCT/IB2006/052651
§ 371 (c)(1),
(2), (4) Date: Jan. 30, 2009

(87) PCT Pub. No.: WO2008/015493
PCT Pub. Date: Feb. 7, 2008

(65) Prior Publication Data
US 2009/0185544 A1 Jul. 23, 2009

(51) Int. Cl.
H04J 13/00 (2011.01)
(52) U.S. Cl.
USPC ........................................... 370/479; 709/226
(58) Field of Classification Search
None
See application file for complete search history.

(56) References Cited

U.S. PATENT DOCUMENTS

| 5,050,162 A * | 9/1991 | Golestani ...................... 370/235 |
| 5,903,550 A | 5/1999 | Spock |
| 6,618,434 B2 | 9/2003 | Heidari-Bateni et al. |
| 6,671,524 B1 * | 12/2003 | Sudo ............................. 455/561 |
| 2003/0046429 A1 * | 3/2003 | Sonksen ....................... 709/246 |
| 2004/0078678 A1 * | 4/2004 | Ramaswamy et al. .......... 714/34 |

FOREIGN PATENT DOCUMENTS

| EP | 01128565 B1 | 8/2001 |
| EP | 1128565 B1 * | 5/2006 |
| GB | 2382955 A | 11/2003 |

OTHER PUBLICATIONS

PCT/IB2006/052651 International Search Report and Written Opinion.

* cited by examiner

Primary Examiner — Yemane Mesfin
Assistant Examiner — Khoa Huynh

(57) ABSTRACT

A device and a method for processing CDMA compliant signals. The method includes receiving input signals; selecting, for each time interval out of multiple evenly length successive time intervals, multiple selected channel processing tasks that are scheduled to be at least partially executed during the time interval; storing input data at a first input buffer and providing data associated with at least one selected processing task from a second input buffer during even time intervals; and storing input data at the second input buffer and providing data associated with at least one selected processing task from the first input buffer during odd time intervals.

20 Claims, 4 Drawing Sheets

METHOD FOR PROCESSING CDMA SIGNALS AND A DEVICE HAVING CDMA SIGNAL CAPABILITIES

FIELD OF THE INVENTION

The present invention relates to methods for processing Code Division Multiple Access (CDMA) signals and for devices having CDMA signal processing capabilities.

BACKGROUND OF THE INVENTION

Various techniques were and are being developed for facilitating wireless communication. One of these techniques is known as Code Division Multiple Access (CDMA). CDMA receivers and transmitters utilize pseudo-random (PN) sequences to spread and de-spread the channel data. This imposes strict timing constraints on the reception process.

Receivers and transmitters can utilize a combination of transmission and reception techniques. A commonly used combination includes CMDA and Time Division Multiplex (TDM). In such a combination CDMA frames include multiple slots. Each slot can be allocated for a certain communication channel out of multiple communication channels.

Due to the multi-path effect in the propagation environment, the receiver receives several replicas (branches) of the CDMA frame. These branches are time shifted in relation to each other. A typical CDMA receiver allocates a rake finger per branch. These rake fingers should be synchronized to each other and to the beginning of the CDMA frame at each branch. U.S. Pat. No. 6,618,434 of Heidari-Bateni et al. titled "Adaptive, multi-mode rake receiver for dynamic search and multipath reception", which is incorporated herein by reference, illustrates a prior art CDMA receiver.

There is a need to provide efficient methods and devices for processing CDMA signals.

SUMMARY OF THE PRESENT INVENTION

A device and a method for processing CDMA signals, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Embodiments of the present invention illustrated in the accompanying drawings provide a method and device for processing CDMA signals that expresses time interval boundaries as well as channel processing tasks to the time base.

Conveniently, multiple time intervals of the same length are defined. The method and device select, for each time interval, channel processing tasks that should be at least partially executed within each time interval and execute the selected channel processing tasks or portions one after the other.

By using a unified time base the timing alignment of different branches and channels is simplified. The single time base simplifies synchronization of search tasks and demodulation tasks, as well as simplifies receiver and transmitter oriented tasks. Accordingly, less integrated circuit area should be allocated for complex synchronization circuits.

By using the same hardware for performing different tasks chip real estate is saved.

Conveniently, the channel processing tasks can be adjusted in a dynamic manner, thus providing a highly flexible device and method.

According to an embodiment of the invention a pair of buffers that act as a double buffer are provided. The roles of the first and second buffer alternate between different time intervals. While input data is being written to a certain buffer, data stored within the other buffer is retrieved and processed during receiver or transmitter channel processing tasks.

Conveniently, various channel processing tasks include de-spreading and combining different branch data that belongs to the same channel.

Conveniently, various hardware components are shared between a receiver and a transmitter, thus further reducing the dies area required for executing various channel processing tasks.

Figure 1:
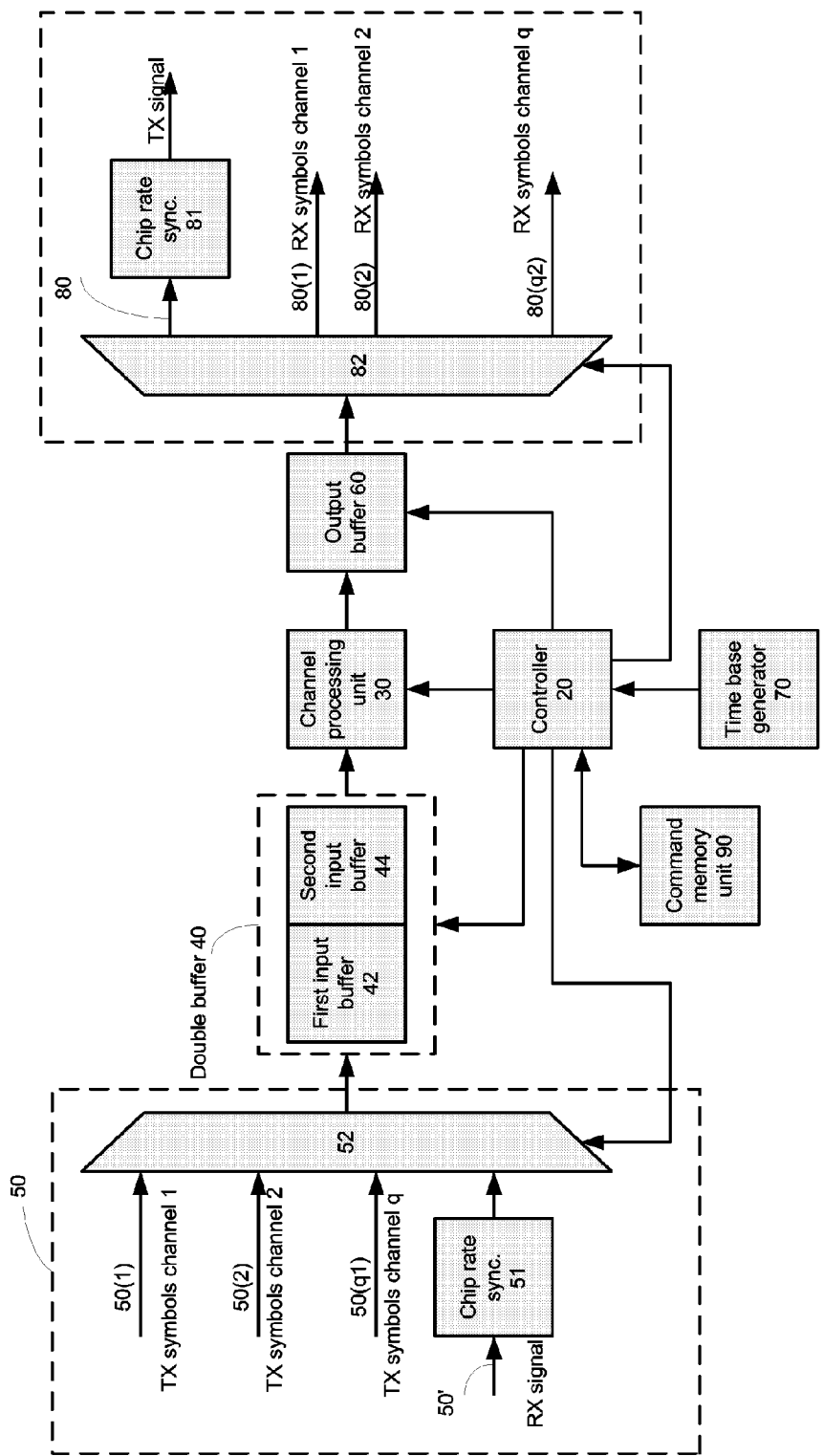
FIG. 1 illustrates a device according to an embodiment of the invention.

FIG. 1 illustrates device 10 according to an embodiment of the invention. Device 10 can be a mobile phone, a mobile device having CDMA communication capabilities, a base station and the like.

Device 10 includes input interface 50, pair of input buffers 42 and 44, controller 50, data processing unit 30, command memory unit 90, time base generator 70, output buffer 60 and output interface 80.

Controller 50 is connected to time base generator 70, to input buffers 42 and 44 and to data processing unit 30. Input buffers 42 and 44 are also connected to input interface 50. Output buffer 60 is also connected to output interface 80.

Data processing unit 30 is adapted to execute channel processing tasks, each including multiple commands, one after the other. The commands are fetched from command memory unit 90 by controller 50. The channel processing tasks can start their execution at one time interval and continue to be executed during one or more consecutive time intervals. The commands as well as the tasks that are formed from commands can be dynamically altered, added or deleted.

Conveniently, controller 50 tracks after tasks that were not completed during one or more previous time intervals and accordingly sends the remaining commands to the data processing unit 30 to continue their execution.

Device 10 operates on a time interval basis. Before a time interval starts (or during that time interval) the controller 50 determines which channel processing tasks should be executed. These selected tasks or more specifically commands that belong to the selected tasks are serially sent to the data processing unit 30 that in turn executes these commands until the tasks end or the time interval passes.

Once a time interval ends and a new time interval begins the device 10 switches between the roles of the first and second input buffers 42 and 44 and executes channel processing tasks (or channel processing task portions) scheduled to be executed during the next time interval.

Device 10 either defines the length of the time intervals or receives a definition of the length of each time interval. The time intervals have the same length and are usually multiple chips long. The inventors used a time base of 38400 chips and time intervals of 64 or 128 chips but other lengths may be adopted. It is noted that the size of the pair of input buffer corresponds to the amount of data received during the time interval.

Controller 20 is adapted to: (i) select, during each time interval out of multiple evenly length successive time intervals, multiple selected channel processing tasks that are scheduled to be at least partially executed during the time interval; (ii) control a storage of input data at the first input buffer 42 and a provision of data associated with at least one selected channel processing task from the second input buffer 44 during even time intervals; and (iii) control a storage of data at the second input buffer 44 and a provision of data associated with at least one selected channel processing task from the first input buffer 42 during odd time intervals.

Conveniently, controller 20 compares between at least one boundary of a time interval and branch and channel start and stop conditions.

According to an embodiment of the invention each channel processing task (or a group of channel processing tasks) can be masked. A masked channel processing task is not executed even if its timing conditions are fulfilled. The masking can be applied in various manners such as allocating an enable bit per channel processing task, and the like.

According to another embodiment of the invention device 10 can indicate if a channel processing task was initiated (during a previous time interval) but not completed. This simplifies the timing condition check, as such as task should be continued during the current time interval.

Time base generator 70 is adapted to provide a time base signal to controller 20, and controller 20 is adapted to define time intervals boundaries, and channel processing tasks boundaries in time base units. For example assuming that the time base generator 70 includes a counter then time interval boundaries as well as start and end of channel processing tasks are expressed in time base signal values. This greatly simplifies the synchronization of various channel processing tasks, even transmitter channel processing tasks and receiver channel processing tasks.

Because the timing values are expressed in time base units the calculations involves performing a time base modulo operation. Thus, if the time base generator 70 can generate values that range between 0 and (X−1) then a modulo X operation is applied when selecting which channel processing tasks should be at least partially selected during a certain time interval.

The following equations illustrate the channel processing task selection process. A channel processing task associated with the B channel of the L branch shall start during the N'th time interval if:

$N$'th time interval start point$\leq$(Branch_Position_$L$+Channel_Start_Phase_$A$)mod $X$<($N$+1)'th time interval start point.

A channel processing task associated with the B channel of the L branch shall end during the N'th time interval if:

$N$'th time interval start point$\leq$(Branch_Position_$L$+Channel_Stop_Phase_$A$)mod $X$<($N$+1)'th time interval start point.

Wherein Branch_Position_L is the time shift of the CDMA PN rollover (PN code wraparound or CDMA frame beginning point) of branch L relative to the time base start point. Channel_Start_Phase_A is a time difference between channel A start time and the CDMA PN Roll of branch L. Channel_Stop_Phase_A is a time difference between channel A end time and the CDMA PN Roll of branch L.

According to yet another embodiment of the invention input data is sequentially written to the first input buffer 42 until a time interval lapses and then is serially written to the second input buffer 44. Accordingly the timing of the write operations determines the location of data. Controller 50 can determine a location of channel data in response to the channel data start time and fetch to the data processing unit 30 the appropriate data that is then processed by the data processing unit 30.

For example, assuming that channel data that belongs to a certain communication channel is received at a certain branch, the boundaries of the channel data within an input register are determines by the following equations:

Location(start of data)=(Branch_Position+Channel_Start_Phase−Start of time interval($n$))Modulo(Time base).

Device 70 can perform both receiver tasks and transmitter tasks. In transmitter tasks the timing of the channel data is known and the task starts at the beginning of the time base.

When components 20-70 execute transmitter tasks they convert symbols to signals and when they execute receiver tasks they convert signals to symbols. Input interface 50 includes multiplexer 52 that has a single input 50' for receiving receiver signals and multiple inputs 50(1)-50(q1), an input per channel, for receiving symbols from q1 channels. The receiver signals pass through a chip rate synchronizer 51. Controller 20 controls multiplexer 52.

Output interface 80 includes a de-multiplexer 82 that has a single output 80' for providing transmitter signals and multiple outputs 80(1)-80(q2), an output per channel, for outputting symbols from q2 channels. The transmitter signals pass through a chip rate synchronizer 81. Controller 20 controls de-multiplexer 82.

The device can use one time base for receiver tasks and one time base for transmitter tasks but this is not necessarily so. Conveniently a single time base is used.

Conveniently the time base frequency is higher than the chip rate frequency thus chip rate synchronizers are required.

Controller 20 can receive (or generate) a list of scheduled events. When an event occurs a certain channel processing tasks should be executed. An event (representing timing information for executing a channel processing task) can be a repetitive event but this is not necessarily so. The most significant bits of the event can be examined to determine if a task associated with the event should be executing during a certain time interval.

Various channel processing tasks can be executed, including for example, search and RAKE operations, dispreading operations and the like.

The controller 20 can include a scheduler and an event database that includes tasks and their execution time. The time base generator 70 generates time base signals that are compared to the timing of tasks within the event database and in response to the comparisons various tasks are executed. Conveniently, the most significant bits of the task timing field indicate whether a task should be executed within a certain time interval.

During a search task the channel processing unit 30 calculates correlations within a search window that can start from an expected PN roll position and ends after a search window period. The search window can be multiple fixed time intervals long. Correlation results are written to output buffer 60 in sequential order. The channel processing unit 30 can then calculates all energies of searching, and the correlation point that is characterized by a maximum energy and passes its timing offset to a host processor that can program the tasks and task timing accordingly. The processor can set a new task such as branch correlation and timing deskewing tasks with the appropriate timing parameters.

Deskewing tasks can retrieve data from an input buffer at locations that correspond to the timing found at the search task. It is noted that the entries of the output buffer 60 already include time compensated data. After retrieving N data symbols, each of the correlation tasks initializes an appropriate branch demodulation and accumulation task. This task accomplishes channel estimation, coherent demodulation and adds branch recovered symbols to a symbol sum of previously processed branches.

This deskewing algorithm works properly in the case of adding/removing branches. A new branch can precede the earliest among the existing branches. The maximal delay spread has to be less than the buffer page size. Increasing this parameters allows to accommodate larger delay spread, but enlarges the processing delay.

A special case of deskewing is soft handover in W-CDMA, when base stations are asynchronous e.g. a difference between PN roll time of any two base stations is undefined. According to the standard, if soft handover is performed, the target base station tries to minimize a time mismatch between start points of DCH frames. For that, the target base station changes a time offset between its PN roll and DCH frame.

Conveniently, these time offsets (branch position and channel start phase of each base station) can be taken into account. This time offset is translated to difference in the retrieval addresses of the data, and once this latter difference is taken into account a deskewing operation can take place.

Figure 2:
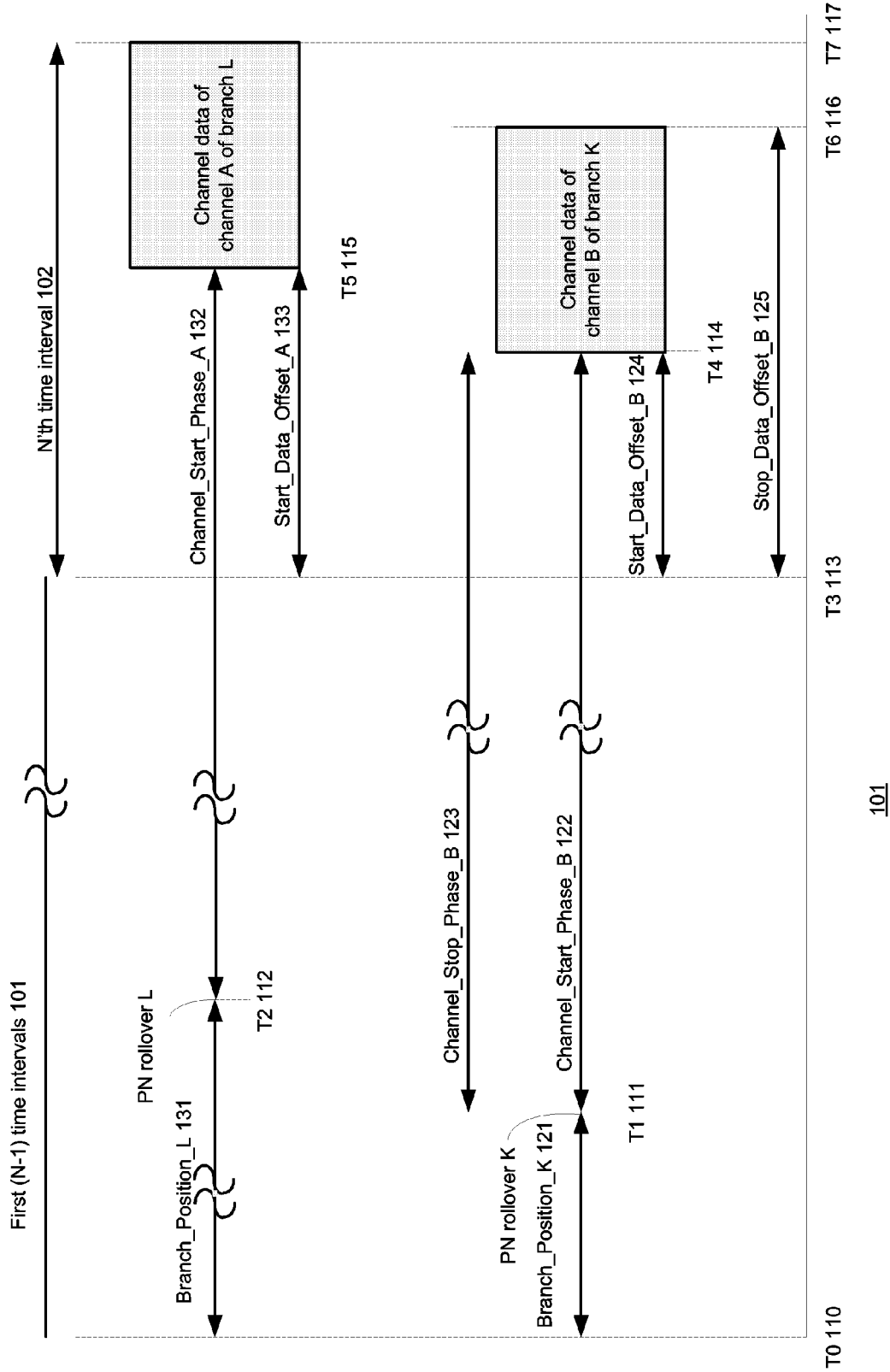
FIG. 2 illustrates a timing diagram according to an embodiment of the invention.

FIG. 2 illustrates a timing diagram according to an embodiment of the invention.

The timing diagram illustrates multiple events. The timing (T0-T7 110-117) of these events is all expressed in time base values.

The timing diagram illustrates many time intervals. The first N−1 time intervals (the first till (N−1)$^{th}$ time intervals) are denoted 101 and it is followed by the N'th time interval. In addition channel processing tasks of data that belongs to data channel A of branch K and to channel B of branch L.

The group of first (N−1) time intervals 101 starts at the first time interval, at time base start point T0 110. At this point in time the time base equals zero.

The first N−1 time intervals 101 end at point T3 113. The N'th time interval 102 starts at point T3 113 and ends at point T7 117. The PN rollover point (start of first TDMA frame) of branch L occurs at T1 111 within a certain time interval out of the first (N−1) time intervals 101. The PN rollover point (start of second TDMA frame) of branch K at T2 112 within a time interval (that can differ from the time interval that includes T1 111) out of the first (N−1) time intervals 101.

Data of channel A of branch K is received at T5 115. The reception exceeds T7 117 (it is expected to continue during the (N+1)'th time interval).

Branch_Position_K 131 equals the difference between T0 110 and T2 112. Channel_Start_Phase_A 132 equals the difference between T2 112 and T5 115. The difference between T3 113 and T5 115 is referred to as Start_Data_Offset_A 133. A channel processing task that processes data of channel A of branch K will start at T5 115.

Data of channel B of branch L is received at T4 114. The reception ends at T6 116. Branch_Position_L 121 equals the difference between T0 110 and T1 111. Channel_Start_Phase_B 122 equals the difference between T1 111 and T4 114. Start_Data_Offset_B 124 equals the difference between T3 113 and T4.

Channel_Stop_Phase_B 123 equals the difference between T1 111 and T6 116. Stop_Data_Offset_B 125 equals the difference between T3 113 and T6. A channel processing task that processes data of channel B of branch L will start at T4 114 and will end at T6 116.

During N'th time interval 102 device 10 determines to execute channel processing tasks related to data of channel A of branch K and data of channel B of branch L. During the (N+1)'th time interval device 10 will continue to execute the channel processing task related to data of channel A of branch K.

Figure 3:
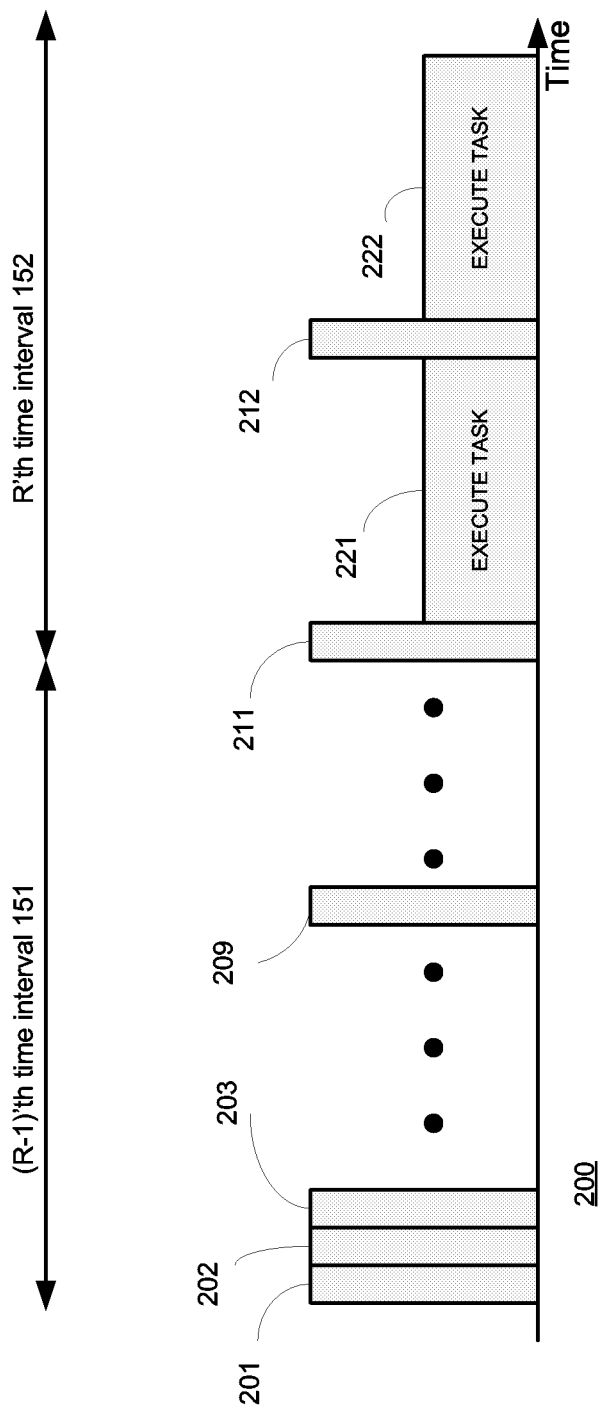
FIG. 3 illustrates a timing diagram according to another embodiment of the invention.

FIG. 3 is a timing diagram illustrating the selection of channel processing tasks and their execution, according to an embodiment of the invention.

At the (R−1)'th time interval the device 10 checks (as illustrates by boxes 201-209) whether it should execute various channel processing tasks. The answer is negative thus the device waits for the next time interval to begin.

When the R'th time interval begins the first check (box 211) indicates that a certain channel processing task should be at least partially executed and it is executed, as illustrated by box 221. When the execution of this task ends a second check is conducted (illustrated by box 212). This second check indicates that a certain channel processing task should be at least partially executed and it is executed, as illustrated by box 222. This sequence of checking and channel processing task execution continues until the end of the time interval.

Figure 4:
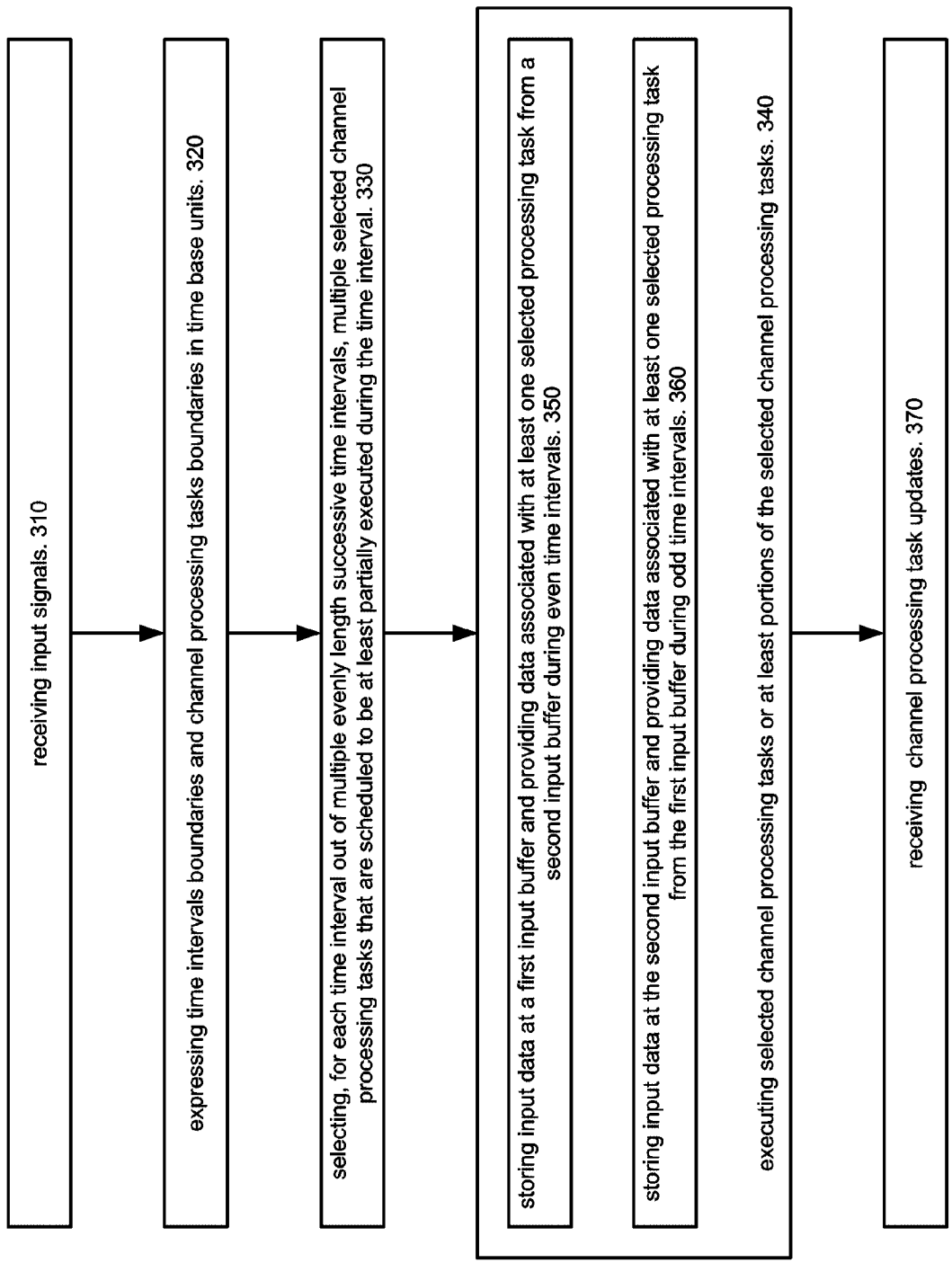
FIG. 4 illustrates a method for processing CDMA signals according to an embodiment of the invention.

FIG. 4 illustrates method 300 for processing CDMA signals according to an embodiment of the invention.

Method 300 starts by stage 310 of receiving input signals. Referring to the example set forth in FIG. 1 these input signals can be CDMA base-band input signals to be converted to CDMA symbols or can be CDMA symbols that should converted to CDMA base-band signals.

Stage 310 is followed by stage 320 of expressing time intervals boundaries and channel processing tasks boundaries in time base units. It is noted that this translation can occur on the fly and not necessarily before stage 330 of selecting.

Stage 320 is followed by stage 330 of selecting, for each time interval out of multiple evenly length successive time intervals, multiple selected channel processing tasks that are scheduled to be at least partially executed during the time interval.

Referring to the example set forth in previous drawings, the selection includes comparing between time interval boundaries and task timing, all expressed in time grid units.

Stage 330 is followed by stage 340 of executing selected channel processing tasks or at least portions of the selected channel processing tasks. Conveniently, stage 340 includes stages 350 and 360.

Stage 350 includes storing input data at a first input buffer and providing data associated with at least one selected processing task from a second input buffer during even time intervals.

Stage 360 includes storing input data at the second input buffer and providing data associated with at least one selected processing task from the first input buffer during odd time intervals.

Conveniently, stage 330 of selecting includes comparing between at least one boundary of a time interval and branch and channel start and stop conditions.

Conveniently, stage 330 of selecting includes ignoring masked channel processing tasks.

Conveniently, stage 340 of executing includes indicating whether a selected channel processing tasks has been partially executed during a certain time interval.

Conveniently, stage 340 of executing includes determining a location of branch and channel data within the pair of input buffers in response to a start time of the channel processing task.

Conveniently, stage 340 of executing includes executing channel processing tasks during search phase and demodulation phase.

Conveniently, stage 340 of executing includes executing transmitter channel processing tasks and receiver channel processing tasks.

Conveniently, stage 340 of executing includes selecting between data representative of a transmitter symbols and received input signals.

Conveniently method 300 includes stage 370 of receiving channel processing task updates. This can include adding tasks or commands, removing tasks of command and updating tasks or commands.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A device for processing CDMA compliant signals, the device comprises:
    an input interface;
    a controller coupled to a data processing unit, to a pair of input buffers and to an output buffer; wherein the controller is adapted to:
    (i) determine whether multiple channel processing tasks for at least one channel of multiple channels in a branch should start during a time interval based on a branch position and a channel start phase of the at least one channel of multiple channels in the branch;
    (ii) select, during each time interval of multiple evenly length successive time intervals, the multiple channel processing tasks that should start during the time interval based on the branch position and the channel start phase from channel processing tasks that are scheduled to be at least partially executed during the time interval;
    (iii) control a storage of input data at the first input buffer and a provision of data associated with the selected multiple channel processing tasks from the second input buffer during even time intervals; and
    (iv) control a storage of data at the second input buffer and a provision of data associated with the selected multiple channel processing tasks from the first input buffer during odd time intervals, wherein the input data is not stored at the first input buffer and the data associated with the selected multiple channel processing tasks is not provided from the second input buffer during the odd time intervals, and wherein the data is not stored at the second input buffer and the data associated with the selected multiple channel processing tasks is not provided from the first input buffer during odd time intervals during the even time intervals.

2. The device according to claim 1 wherein the controller is adapted to compare between at least one boundary of a time interval and branch and channel start and stop conditions.

3. The device according to claim 1 further adapted to ignore masked channel processing tasks.

4. The device according to claim 1 further adapted to indicate whether a selected channel processing tasks has been partially executed during a previous time interval.

5. The device according to claim 1 further comprising a time base generator adapted to provide a time base signal to the controller wherein the controller is adapted to define time intervals boundaries, and channel processing tasks boundaries in time base units.

6. The device according to claim 1 wherein the controller is adapted to determine a location of branch and channel data within the pair of input buffers in response to a start time of the channel processing task.

7. The device according to claim 1 further adapted to receive channel processing task updates.

8. The device according to claim 1 adapted to execute channel processing tasks during search phase and demodulation phase.

9. The device according to claim 1 adapted to execute transmitter channel processing tasks and receiver channel processing tasks.

10. The device according to claim 1 wherein the input interface is adapted to select between data representative of a transmitter symbols and received input signals.

11. A method for processing CDMA compliant signals, the method comprising:
    receiving input signals;
    determining whether multiple channel processing tasks for at least one channel of multiple channels in a branch should start during a time interval based a branch position and a channel start phase of the at least one channel of multiple channels in the branch;
    selecting, for each time interval of multiple evenly length successive time intervals, the multiple channel processing tasks that should start during the time interval based on the branch position and the channel start phase from channel processing tasks that are scheduled to be at least partially executed during the time interval;
    storing input data at a first input buffer and providing data associated with the selected multiple processing tasks from a second input buffer during even time intervals; and
    storing input data at the second input buffer and providing data associated with the selected multiple processing tasks from the first input buffer during odd time intervals, wherein the input data is not stored at the first input buffer and the data associated with the selected multiple processing tasks is not provided from the second input buffer during the odd time intervals, and wherein the input data is not stored at the second input buffer and the data associated with the selected multiple processing tasks is not provided from the first input buffer during the even time intervals.

12. The method according to claim 11 wherein the selecting comprises comparing between at least one boundary of a time interval and branch and channel start and stop conditions.

13. The method according to claim 11 further comprising ignoring masked channel processing tasks.

14. The method according to claim 11 comprising executing selected channel processing tasks and wherein the executing comprises indicating whether a selected channel processing tasks has been partially executed during a certain time interval.

15. The method according to claim 11 further comprising defining time intervals boundaries and channel processing tasks boundaries in time base units.

16. The method according to claim 11 comprising executing selected channel processing tasks and wherein the executing comprises determining a location of branch and channel data within the pair of input buffers in response to a start time of the channel processing task.

17. The method according to claim 11 further comprising receiving channel processing task updates.

18. The method according to claim 11 comprising executing selected channel processing tasks wherein the executing comprises executing channel processing tasks during search phase and demodulation phase.

19. The method according to claim 11 comprising executing selected channel processing tasks, wherein the executing comprises executing transmitter channel processing tasks and receiver channel processing tasks.

20. A method for processing CDMA compliant signals, the method comprising:
- receiving input signals;
- determining whether multiple channel processing tasks for at least one channel of multiple channels in a branch should start during a time interval based a branch position and a channel start phase of the at least one channel of multiple channels in the branch, wherein the branch position is a time shift of a frame beginning point of the branch relative to a time base start point, and wherein the channel start phase is a time difference between a start time of the at least one channel in the branch and the frame beginning point of the branch;
- selecting, during each time interval of multiple intervals, the multiple channel processing tasks that should start during the time interval based on the branch position and the channel start phase from channel processing tasks that are scheduled to be at least partially executed during the time interval, wherein the selected multiple channel processing tasks are serially executed with respect to each other during the time interval;
- storing input data at a first input buffer and providing data associated with the selected multiple channel processing tasks from a second input buffer during even time intervals;
- and storing input data at the second input buffer and providing data associated with the selected multiple channel processing tasks from the first input buffer during odd time intervals, wherein the input data is not stored at the first input buffer and the data associated with the selected multiple processing tasks is not provided from the second input buffer during the odd time intervals, and wherein the input data is not stored at the second input buffer and the data associated with the selected multiple processing tasks is not provided from the first input buffer during the even time intervals.

* * * * *